(12) United States Patent
Laliberté et al.

(10) Patent No.: US 8,966,705 B2
(45) Date of Patent: Mar. 3, 2015

(54) LID FOR LEAVES COLLECTION WITH A BLOWER/VACUUM AND THE DISCHARGE OF DEBRIS INTO A BAG

(71) Applicants: William Laliberté, Québec (CA); Denis Laliberté, Québec (CA)

(72) Inventors: William Laliberté, Québec (CA); Denis Laliberté, Québec (CA)

(*) Notice: Subject to any disclaimer, the term of this patent is extended or adjusted under 35 U.S.C. 154(b) by 28 days.

(21) Appl. No.: 14/020,801

(22) Filed: Sep. 7, 2013

(65) Prior Publication Data

US 2014/0075706 A1 Mar. 20, 2014

(30) Foreign Application Priority Data

Sep. 17, 2012 (CA) ..................................... 2790305

(51) Int. Cl.
    *A47L 9/14* (2006.01)
    *E01H 1/08* (2006.01)
    *A01G 1/12* (2006.01)

(52) U.S. Cl.
    CPC .............. *E01H 1/0809* (2013.01); *A01G 1/125* (2013.01); *E01H 1/0827* (2013.01); *Y10S 55/03* (2013.01)
    USPC ............... 15/246.2; 15/347; 15/352; 15/330; 15/344; 55/374; 55/429; 55/DIG. 3

(58) Field of Classification Search
    USPC ............... 15/246, 246.2, 330, 344, 347, 352; 55/428, 429, 374, 467, DIG. 3
    IPC .......................................................... A47L 9/14
    See application file for complete search history.

(56) References Cited

U.S. PATENT DOCUMENTS

| | | | |
|---|---|---|---|
| 6,170,118 B1 * | 1/2001 | McIntyre et al. | 15/327.6 |
| 6,574,829 B1 * | 6/2003 | Marcum et al. | 15/347 |
| 7,752,706 B2 * | 7/2010 | Goodger | 15/327.4 |

* cited by examiner

*Primary Examiner* — David Redding

(57) ABSTRACT

A round-shaped lid with a curved edge and domed air outlets to collect leaves with a blower/vacuum in suction mode. The leaves shredded by the blower/vacuum are discharged into a connecting pipe which is attached to a lid inserted into the opening of a large debris collection bag. In particular, the lid has three main openings, one for the entry of debris and two for the air outlet. The connecting pipe is made of ribbed plastic and is held to the lid by the sides of a groove and to the blower/vacuum by a plastic sleeve with cable ties. A piece of thick plastic or metal is placed under a plastic membrane and the debris collection bag in order to protect them during movement over the ground. The debris is collected directly into the bag that will be discarded.

23 Claims, 11 Drawing Sheets

LID FOR LEAVES COLLECTION WITH A BLOWER/VACUUM AND THE DISCHARGE OF DEBRIS INTO A BAG

TECHNICAL FIELD

The present invention relates to a lid with a curved edge and domed air outlets and a new method of attachment of the ribbed connecting pipe used for the collection of leaves with a portable blower/vacuum in vacuum mode for the vacuuming and the shredding of leaves and the discharge of debris into a bag.

BACKGROUND OF THE INVENTION

The blower/vacuums are well known as lawn and garden implements which are used for blowing or picking up various debris, such as leaves and grass clippings. A typical blower/vacuum in suction mode comprises a housing that encloses an electric motor having a rotatable shaft on which is connected a fan placed in a housing. During the rotation of the motor, the fan mounted on the shaft rotates and creates a suction which draws the leaves and other lawn debris into the fan inlet where they are shredded and then ejected from the fan outlet. A handle is provided on the housing to allow the operator to hold and direct the inlet of the blower/vacuum. In the mode normally used, the blower/vacuum discharges debris into a small collection bag coupled directly to the fan outlet of the blower/vacuum. The operator wears the debris collection bag on his shoulder with a belt attached to the bag. The weight of the debris that accumulates in the bag tires out the operator in time. When the collection bag is full, the operator disconnects the collection bag from the fan outlet of the blower/vacuum, unzips a zipper provided in the bag, and then dumps the debris out of the bags into a larger disposable bag to collect debris, a trash can or a place for decomposing debris The operator can then close the collection bag with the zipper, connect it to the blower/vacuum and continue to collect debris. This type of debris collection bag, although effective for collecting small amounts of debris, quickly becomes limiting for the collection of large amounts of debris. It must frequently be emptied which becomes tedious and slows significantly the work of the operator. In addition to the weight of the bag and debris, the bag being suspended from the operator's body, the dust emitted by the air output through the bag pores can be annoying to operators.

Other debris collection systems were invented to correct problems of the conventional system described above. U.S. Pat. No. 7,506,403 B2 has a collection bag in a cart with wheels, the bag must be emptied when full and the system is designed for one type of bag. The operator also has the disadvantage of pulling a wagon wheel with the bag of debris. U.S. Pat. No. 7,587,785 B2, the operator wears the receptacle on his back to collect the debris and debris must be emptied into a bag for disposal. For the U.S. Pat. No. 6,988,293 B2, leaves are collected directly into a bag with slots to the air outlet, the bag is disposable which eliminates the need to pour the debris and the bag is designed specifically for the system. The bag is attached to the blower/vacuum and the weight of the bag and debris is carried by the operator. It is not possible to use a wide variety of bags to collect debris which limits the choice of supplier. The bag is of small dimensions compared to the collection bag for lawn debris. For U.S. Pat. No. 7,962, 996 B1, U.S. Pat. No. 7,917,992 B2 and U.S. Pat. No. 7,752, 706 B2, the debris is collected in a large collection bag inserted into a large solid container mounted on a cart. The cart can be moved and carries the weight of debris. This system is relatively heavy and large. It can be cumbersome to move over rough terrain. The operator must move the cart as the work progresses. In U.S. Pat. No. 8,091,815 B2, blower/vacuum and leaf debris are transported in a wheelbarrow or a big truck while for U.S. Pat. No. 8,100,416 B1, it is transported in a small two-wheeled cart. For the latter, the debris is collected in a small bag. These two patents have the same shortcomings as the aforementioned patents. For U.S. Pat. Nos. 7,257,858 B2, 6,574,829 B1 and 4,713,858, the debris collection system is maintained by a support frame made of metal or a metal container. Debris is collected into a large bag. These systems are fixed and the leaves must be near the system to be collected. The operator cannot easily move the system in use. For U.S. Pat. Nos. 7,341,612 B2, 7,185,389 B2 and 4,723,971, the debris is sucked into a small bag or into a rigid container without being shredded first, requiring much more space for storage. In addition, the materials must be small as dust or sawdust, and it is not suitable for collection of whole leaves. The system moves on casters or wheels which can pose a problem when the ground is uneven. A single bag model can be used.

Accordingly, it is necessary in the art of collecting debris to have a debris collection system allowing both the mobility of the operator and the collection of large amounts of debris without having to pour debris in another bag and without requiring the operator to carry the bag of debris. Similarly, it is also necessary to have a versatile system that can use a wide variety of bags sold by different companies for the collection of debris to reduce the cost of buying bags and therefore storage costs of debris.

In the art of debris collection, the debris is usually kept in bags placed in metal containers or plastic which is covered with a lid to prevent odors and to protect them from weather. These lids are often round in shape and slightly curved. These lids are designed to be watertight and airtight for the needs for which they are intended. One of these types of lid has a groove on the side wall. U.S. Pat. Nos. 4,691,840, 5,163,577, 5,085, 340, 5,160,060, U.S. Des. 326,342 and CA 2542229 refer to this type of lid. These lids do not have any openings in the top, which takes away the possibility of inserting debris into containers or bags inside the containers without having to remove the container lid.

Accordingly, as this type of lid, round in shape and having a groove on the side wall, with openings for the air outlet and openings for the discharge of lawn debris directly into a collection bag using a blower/vacuum in suction mode, did not exist, Laliberté, W. and D. Laliberté, 2011, in the patent application CA 2,748,583 (U.S. Ser. No. 13/539,322), have invented a type of lid adapted to this need. They also presented the possible modifications to existing lids using their invention to allow their use with the collection system described in their patent application.

The type of lid stated in the patent application CA 2,748, 583 (U.S. Ser. No. 13/539,322) from Laliberté, W. and D. Laliberté, 2011, with a groove on the side to hold the bag up around the lid with a bungee cord, although very effective, the application technique molding plastics is more expensive than the manufacturing technical plastic injection. Indeed, the presence of the groove on the side does not allow the use of the technique of injection molding, which is better suited for producing large quantities with the lowest costs per lid.

This is in order to reduce production costs inherent in this type of lid that a new type of lid without a groove, but with a curved edge to the outside, was designed to be manufactured by plastic injection molding. This type of lid is described in patent applications CA 2,764,509 (U.S. Ser. No. 13/555,147) from Laliberté, W. and D. Laliberté, 2012 and CA 2,780,100

(U.S. Ser. No. 13/561,001) from Laliberté, W. and D. Laliberté, 2012. However, in these patent applications, the ribbed connecting pipe is attached to the lid with a ribbed coupling pipe and requires the use of several flexible cable ties.

In the patent application CA 2,780,100 (U.S. Ser. No. 13/561,001) from Laliberté, W. and D. Laliberté, 2012, the lid with a curved edge and domed air outlets has a molded rigid handle and a hook molded at the same time as the lid, the hook holds the 90-degree elbow to the entrance of debris. The handle and the hook, which is used to hold the 90 degree elbow, are complex to mold and pose a risk of breaking in the effort and irreversibly damaging the lid.

In patent applications CA 2,748,583 (U.S. Ser. No. 13/539,322), CA 2,764,509 (U.S. Ser. No. 13/555,147) and CA 2,780,100 (U.S. Ser. No. 13/561,001) from Laliberté, W. and D. Laliberté the membrane that supports the debris collection bag is not protected, which limits the use of the collection system on lawn ground.

The ribbed connecting pipe is maintained on the fan outlet of the blower/vacuum with a plastic coupling sleeve held by a single plastic cable tie near each end. During heavy use, the sleeve may detach from the ribbed connecting pipe or the fan outlet of the blower/vacuum.

This is to improve the four points mentioned above as new methods have been developed for the leaf collection system.

SUMMARY OF THE INVENTION

The lid is round in shape, with a flat or slightly domed top. The top of the lid has the first and second rectangular openings for air outlet with a domed top and back, a third opening for the entrance of debris, which is partly round with a U-shaped flared extension whose base is directed towards the center of the lid. This opening has a narrower U than in the patent application CA 2,780,100 (U.S. Ser. No. 13/561,001). It allows the insertion of a groove of the ribbed connecting pipe into the third opening and inserting the first end (male part) of the 90 degree elbow into the opening of the ribbed connecting pipe. Two holes are located near the end of the U and hold it with a plastic cable tie to the second end (female part) with a hole of the 90 degree elbow on the inside face of the lid. Two holes in the lid are located between the two air outlets to allow for making a handle with a plastic cable tie. Two holes are located on each side of the opening for the entry of debris and used to attach a piece of thick plastic or metal. In addition, the lid on the inside has six hooks to hold the first and second strainers. The lid wall is inclined outwardly to facilitate the movement of waste to the debris collection bag. The lid has a curved edge bent in a U shape consisting of the side wall of the lid and the curve of the extension of the latter bent towards the outside of the lid. Inside the U, at regular intervals, are side reinforcements to give more rigidity to the lid. Four elevations are placed near the lower limit of the curved edge to hold the elastic cord. At the lower limit of the curved edge, between the elevations, are placed rough adhesive anti-skid tape sections to increase the coefficient of friction between the lid wall and the debris collection bag. The elevations and the rough anti-skid tape sections are used to maintain the bag in place around the lid when the elastic cord is placed over the bag at this location. The lid and the debris collection bag are on a plastic membrane. A piece of thick plastic or metal is placed under the membrane. The ribbed connecting pipe is held on the fan outlet of a blower/vacuum with a plastic coupling sleeve and four plastic cable ties.

More specifically, the invention relates to:
a) the new method for holding the ribbed connecting pipe to the lid is to make a slit in the end of the ribbed connecting pipe that will be inserted into the third opening of the lid. This slot allows the wall of the ribbed connecting pipe to compress onto the inside so as to insert a groove of the ribbed connecting pipe into the third opening of the lid (for the entry of debris). The first end (male part) of the 90 degree elbow to the entrance of debris is then inserted into the opening of the ribbed connecting pipe. The ribbed connecting pipe is kept into the third opening of the lid by the sides of the groove near the end of the ribbed connecting pipe.
b) a plastic cable tie is used to make a handle by passing the cable tie through the two holes located between the first and second air outlets, and by closing the cable tie on the inner face of the lid without tightening it in order to allow a curve on the top of the lid.
c) the second end (female part) of the 90 degree elbow is attached to the inner face of the lid with a plastic cable tie. The cable tie is passed through the two holes in the lid near of the U and the hole in the second end of the 90 degree elbow.
d) the method of attaching the ribbed connecting pipe to the blower/vacuum with a plastic coupling sleeve is to use two plastic cable ties placed side by side close to each end of the plastic coupling sleeve.
e) the installation of a piece of thick plastic or metal attached on the lid top which also has a portion under the membrane, near the lid.

The main advantage of the new method for attaching the ribbed connecting pipe to the lid is that it keeps the ribbed connecting pipe linked to the lid without using a ribbed coupling pipe and using only one plastic cable tie. The method of attachment is easier to use by the operator and requires less parts and time for installing the ribbed connecting pipe to the lid.

Another important advantage of this method is that the production costs are significantly reduced by using fewer parts and time for installation.

The main advantage of the method for attaching the ribbed connecting pipe to the fan outlet pipe of the blower/vacuum by using two plastic cable ties near each end is that it prevents the coupling sleeve from coming off during intense use.

The presence of a piece of thick plastic or metal protects the membrane from wear under the debris collection bag and allows its use on a ground rougher than only grass.

The main advantage of this system for collecting leaves is that it allows for faster collection of leaves by using a larger bag, and debris is stored directly into the debris collection bag. It is no longer necessary to pour debris from one bag to another. It is also easier to use, since it is not necessary to transport debris in a bag on the shoulder or a cart. It also allows for greater mobility in the field. It also increases the performance of the blower/vacuum by reducing the loss of suction caused by the resistance of the air passing through the pores of the cloth bags usually used. The method of attachment of the ribbed connecting pipe is compatible with several models of blower/vacuum.

BRIEF DESCRIPTION OF THE DRAWINGS

This invention will be described in more detail in the following description taken in conjunction with the following drawings, wherein like reference numbers indicate like elements throughout.

DETAILED DESCRIPTION OF THE PREFERRED EMBODIMENT

Figure 1:
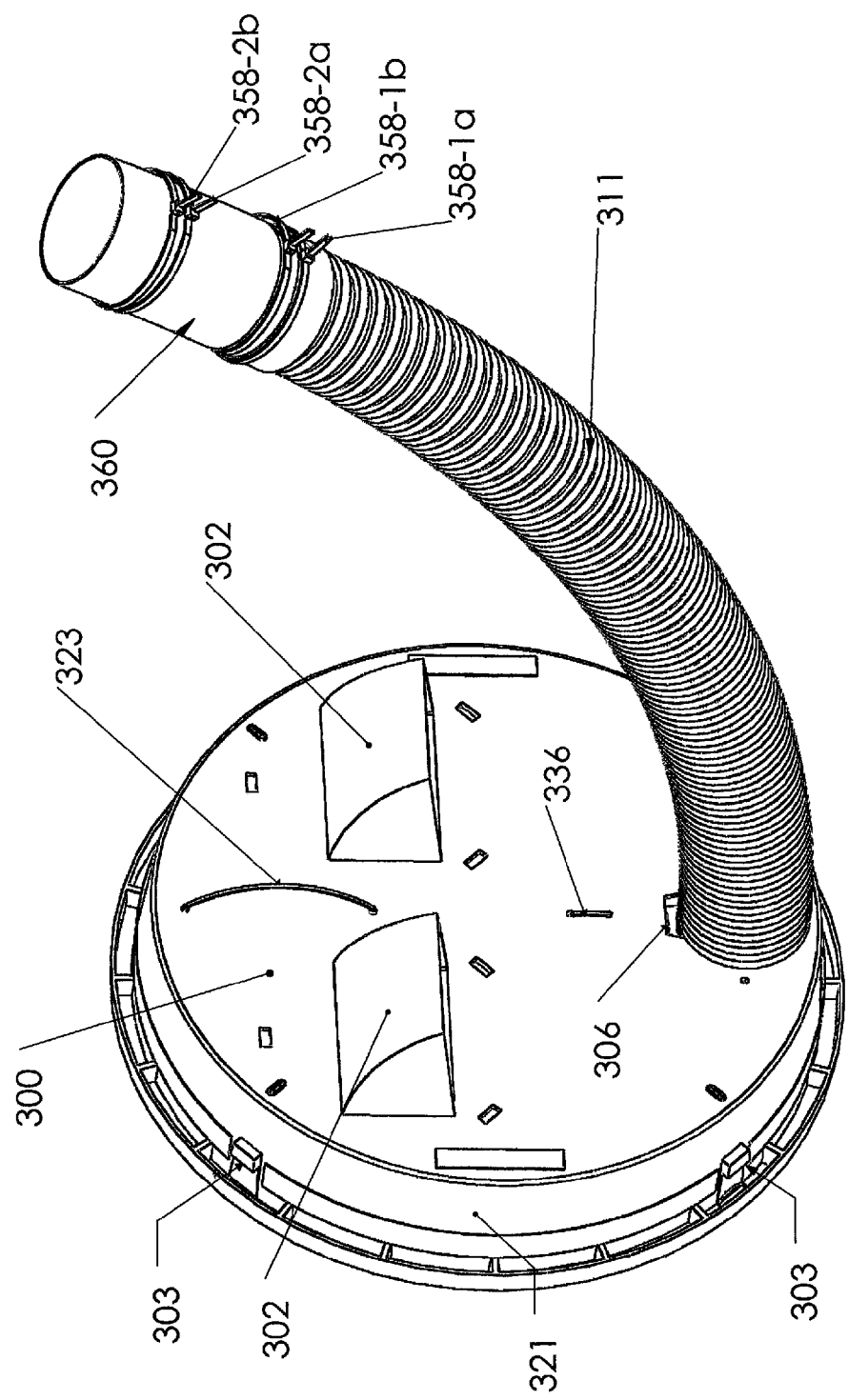
FIG. 1 is a perspective view of the top of the lid with curved edge and domed air outlets with the attachment of the ribbed coupling pipe.
Figure 2:
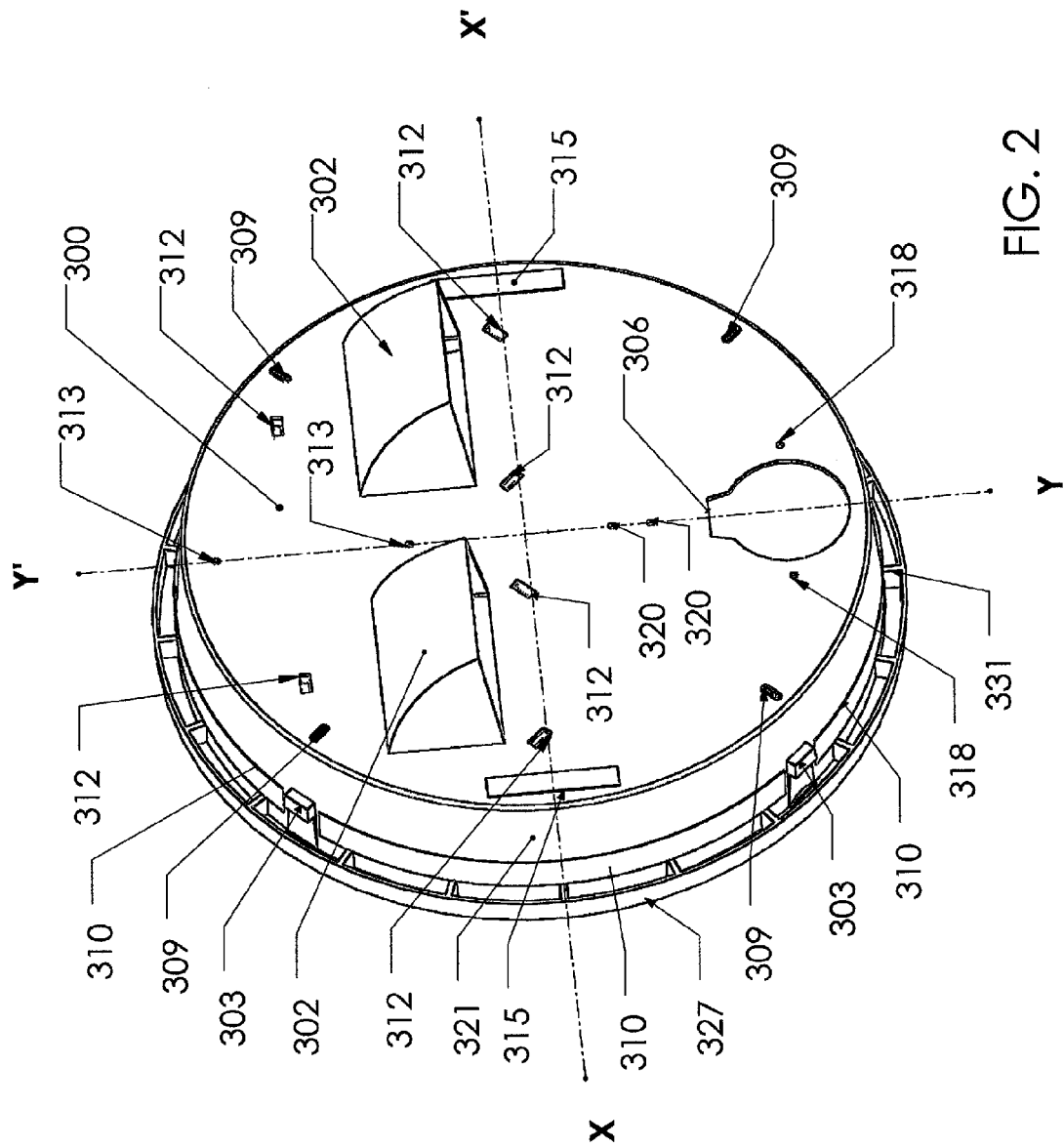
FIG. 2 is a perspective view of the top of the lid with curved edge and domed air outlets.
Figure 3:
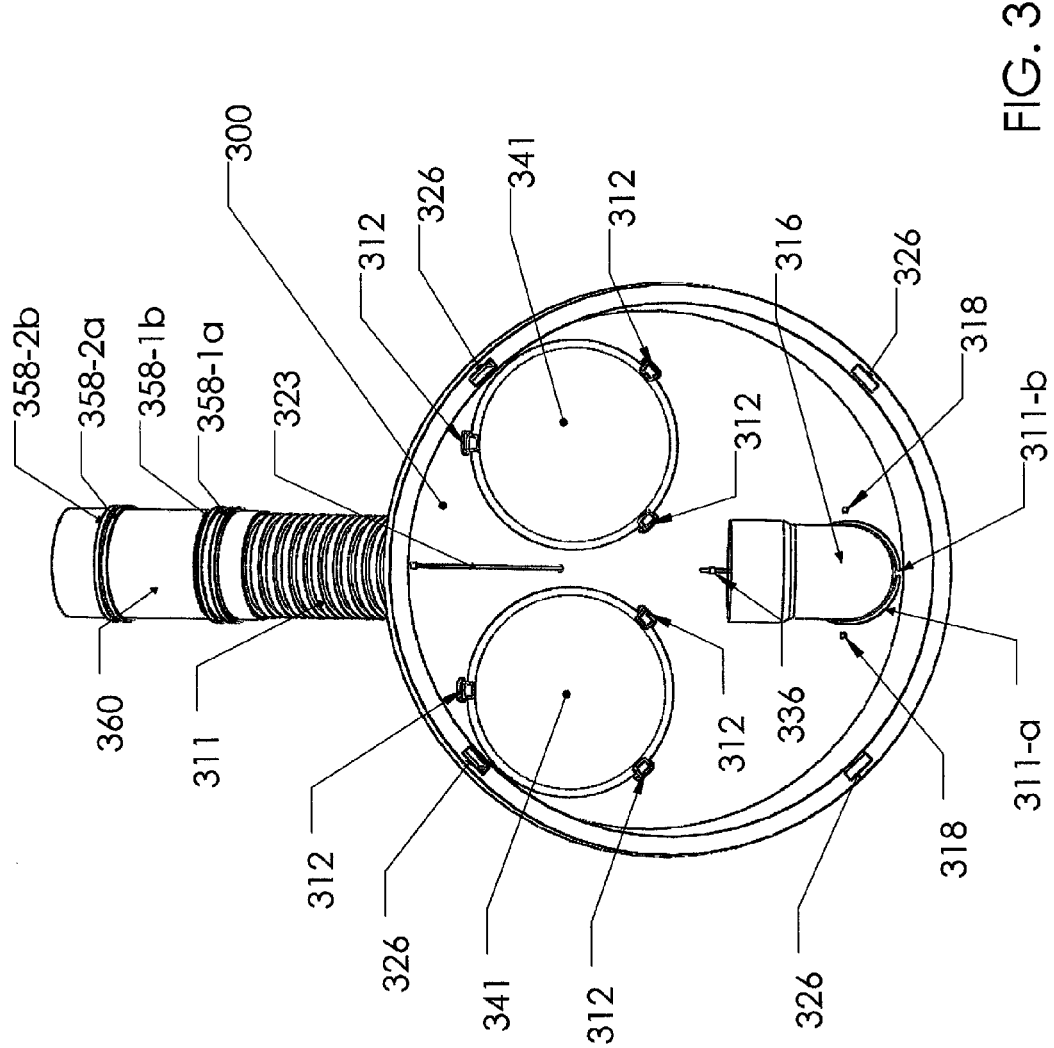
FIG. 3 is a view of the inside of the lid with curved edge and domed air outlets.

The lid 300 with curved edge and domed air outlet has a round shape with a flat or slightly domed top and with the side wall slightly inclined outwards (FIG. 1). On top of the lid, there are the first and second rectangular openings 302 for the air outlet with domed top (FIG. 1). The two air outlets 302 are an integral part of the lid and are molded at the same time as the lid 300. The air outlets 302 are parallel with respect to each other and are on either side of the axis YY' and oriented downwardly as shown in FIGS. 2 and 3. However, it is also understood that they may be oriented to one side or the other of the lid relative to the axis YY'. The air outlets are oriented to direct air to the floor. The center of each of the air outlets 302 is located equidistant to the axis XX' (FIG. 2). The center of each of the air outlets 302 is located equidistant to the axis YY', albeit the distance from the center of each of the air outlets 302 to the axes XX' and YY' are not the same.

Figure 8:
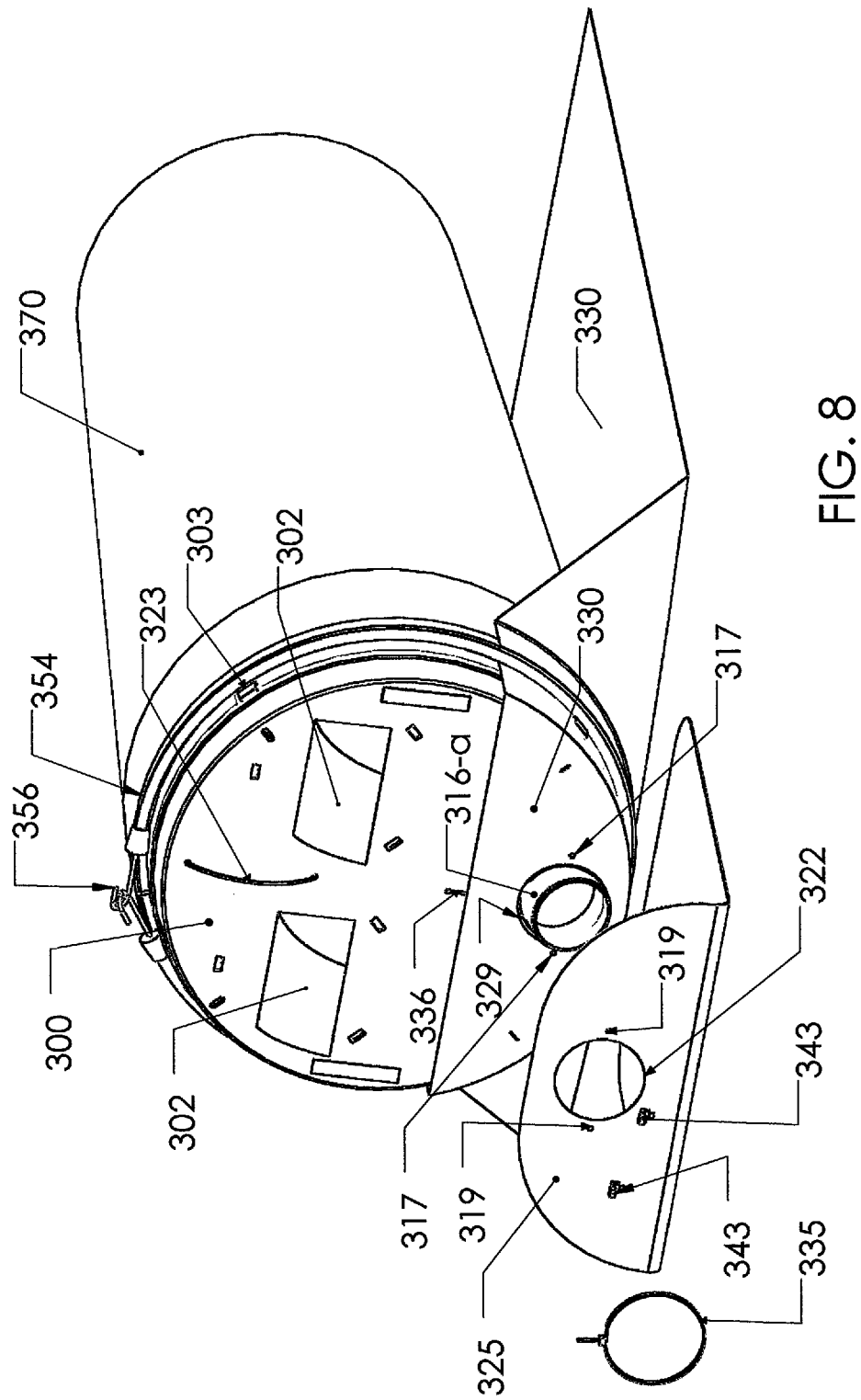
FIG. 8 is a perspective view of the lid with curved edge and domed air outlets inserted into the debris collection system without the ribbed connecting pipe and blower/vacuum.
Figure 9:
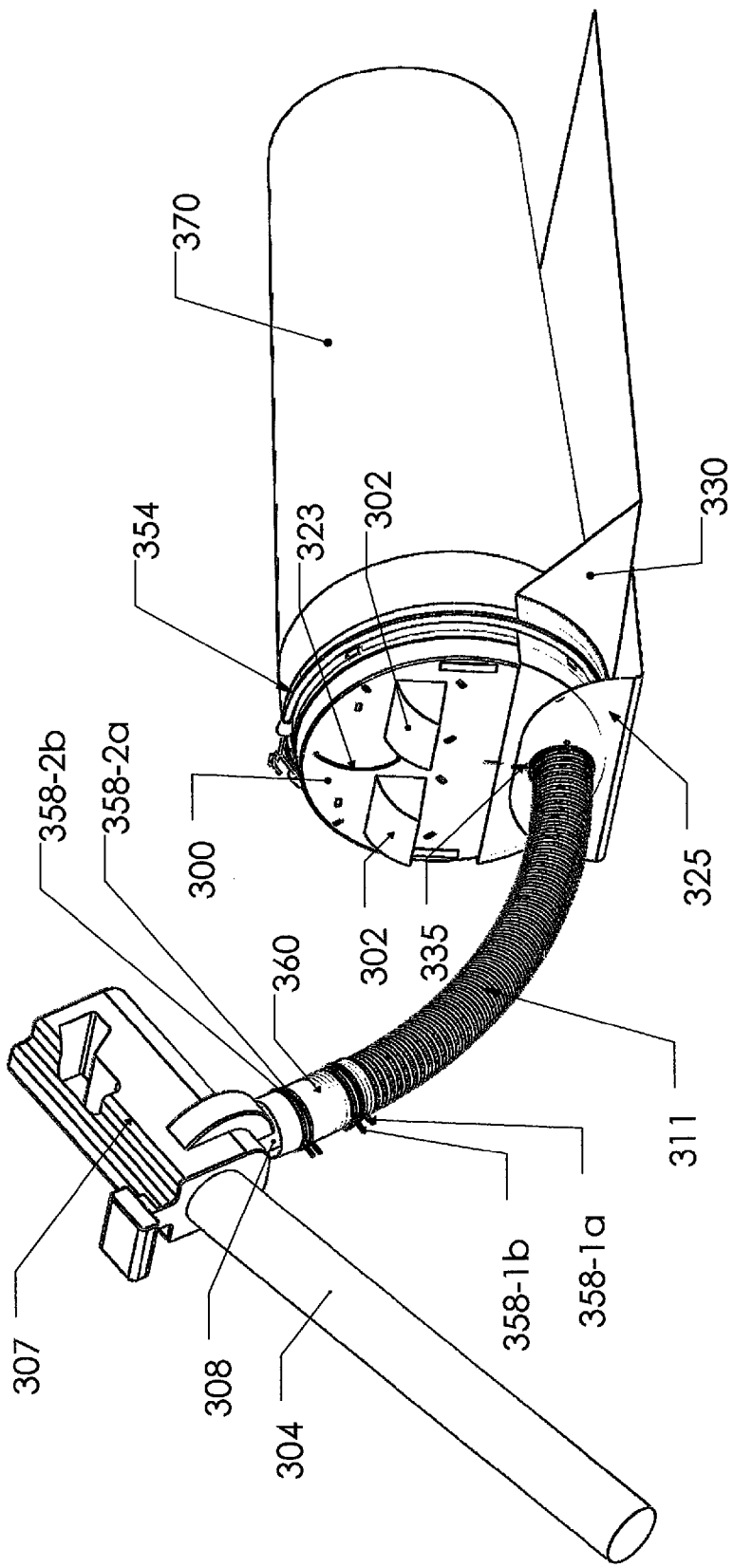
FIG. 9 is a perspective view of the lid with curved edge and domed air outlets inserted into the debris collection system in its assembled form, which is connected to the output of a blower/vacuum.

It is also understood that the distances may vary according to the needs. Around each of the two air outlets 302 are placed three elevations 312 (FIGS. 2 and 3) shaped like a hook for holding the first and second strainers 341 in place (FIG. 3). The elevations 312 are arranged in an isosceles triangle in the preferred embodiment, but it is also understood that they can be arranged in different ways. It is also understood that the number of elevations 312 may be smaller or larger than three to maintain the strainers 341. The strainers 341 are used to filter the air coming out of the lid through the air outlets 302 and retain coarse debris within the debris collection bag 370 (FIGS. 8 and 9). Both strainers 341 overlap on the inner face of the lid the first and second openings to the air outlet 302 (FIGS. 3, 5 and 6) and are arranged concentrically relative to the openings 302. Note that the strainers 341 do not have ears on the periphery of the rigid edge. In this arrangement, the strainers 341 are held onto the lid 300 by three hooks 312, whose arrangement allows them to hold the strainers 341 by their rigid edge. On FIGS. 5 and 6, the shape of the hooks 312 is clearly visible and shows their positions on the rigid edge of the strainers 341 to keep them in contact with the inside of the lid 300.

On top of the lid 300, a handle 323 is made with a plastic cable tie. The handle 323 is created by passing the plastic cable tie into the two holes 313 (FIG. 2) and connecting the two ends on the inner face of the lid. The two holes 313 are located on the central axis YY' at the junction of the quadrants XY' and X'Y'. The handle 323 is especially useful in order to orient the lid when collecting leaves and debris and to lift the entrance of the collection bag 370 (FIGS. 8 and 9) from time to time to move debris to the bottom.

Figure 10:
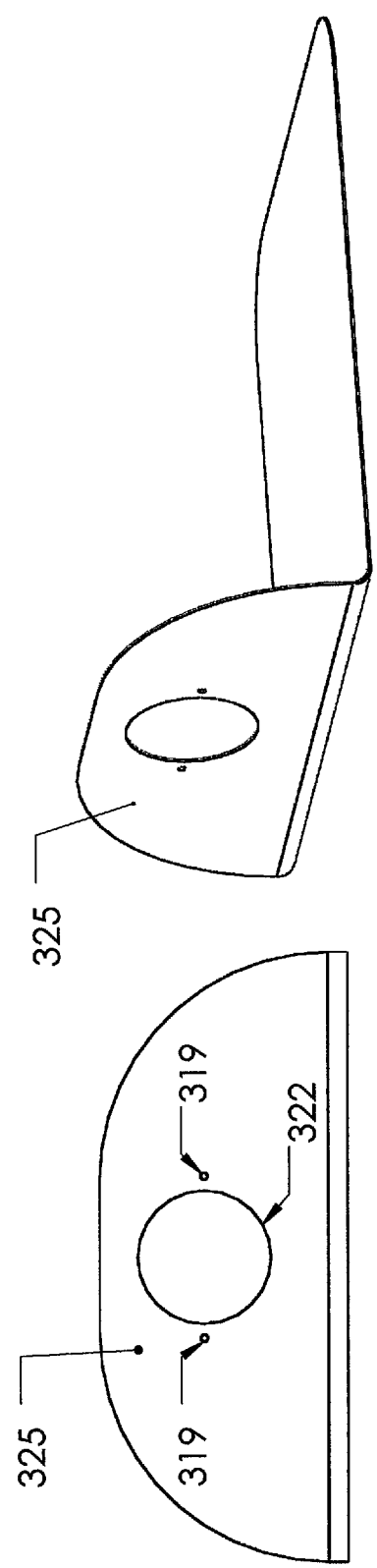
FIG. 10 is a front and a perspective view of the piece of thick plastic.

The lid 300 also has on the top a third opening 306 near the edge in order to insert the ribbed connecting pipe 311 for the entry of debris through the lid 300. The opening 306 is partially round shaped with a U-shaped extension whose base is flared towards the center of the lid 300. On each side of the opening 306, there are two small holes 318. These holes serve as anchor points for attaching a piece of thick plastic or metal 325 to the lid 300 (FIGS. 8, 9 and 10).

Figure 4:
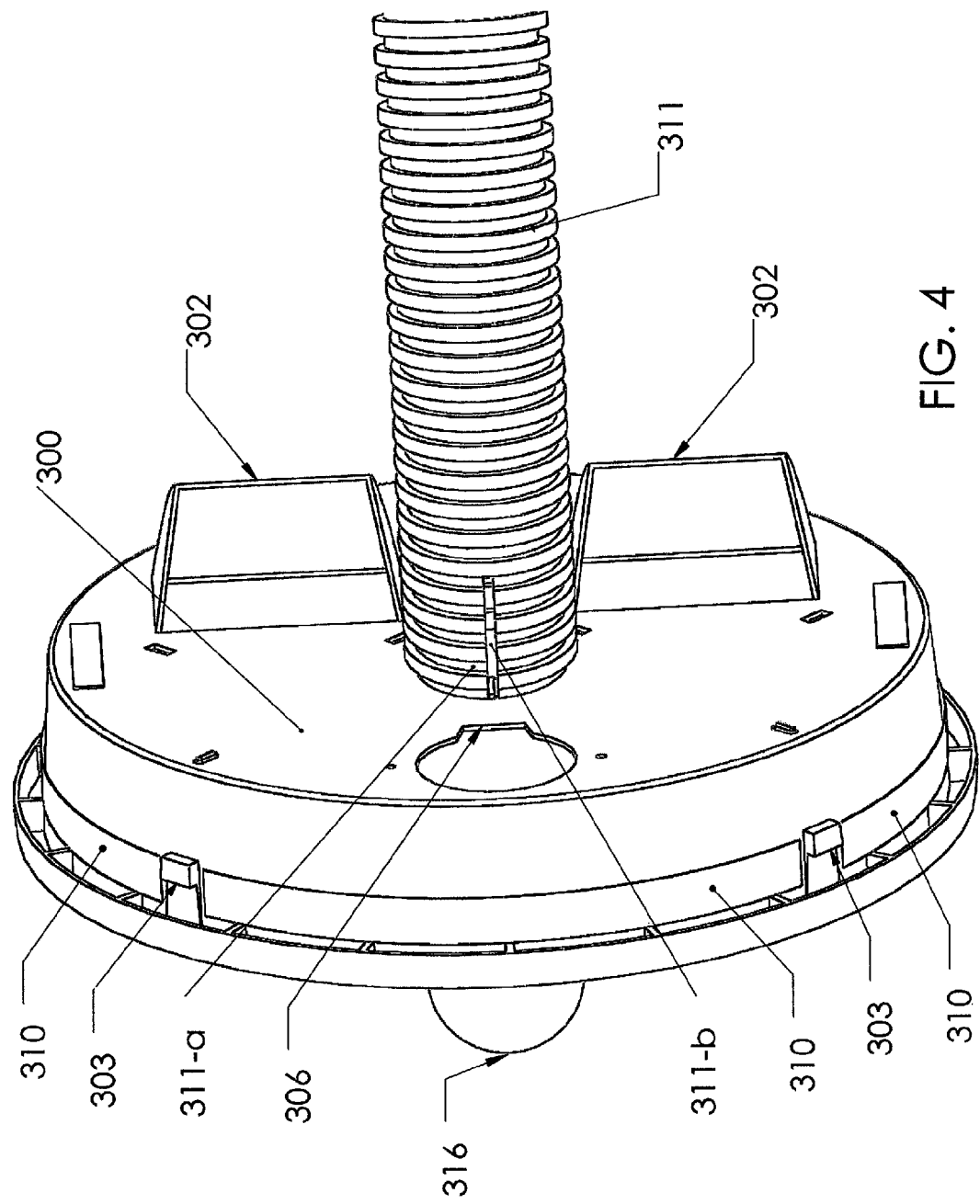
FIG. 4 is a perspective view of the side and the top of the lid with curved edge and domed air outlets with the ribbed connecting pipe.
Figure 5:
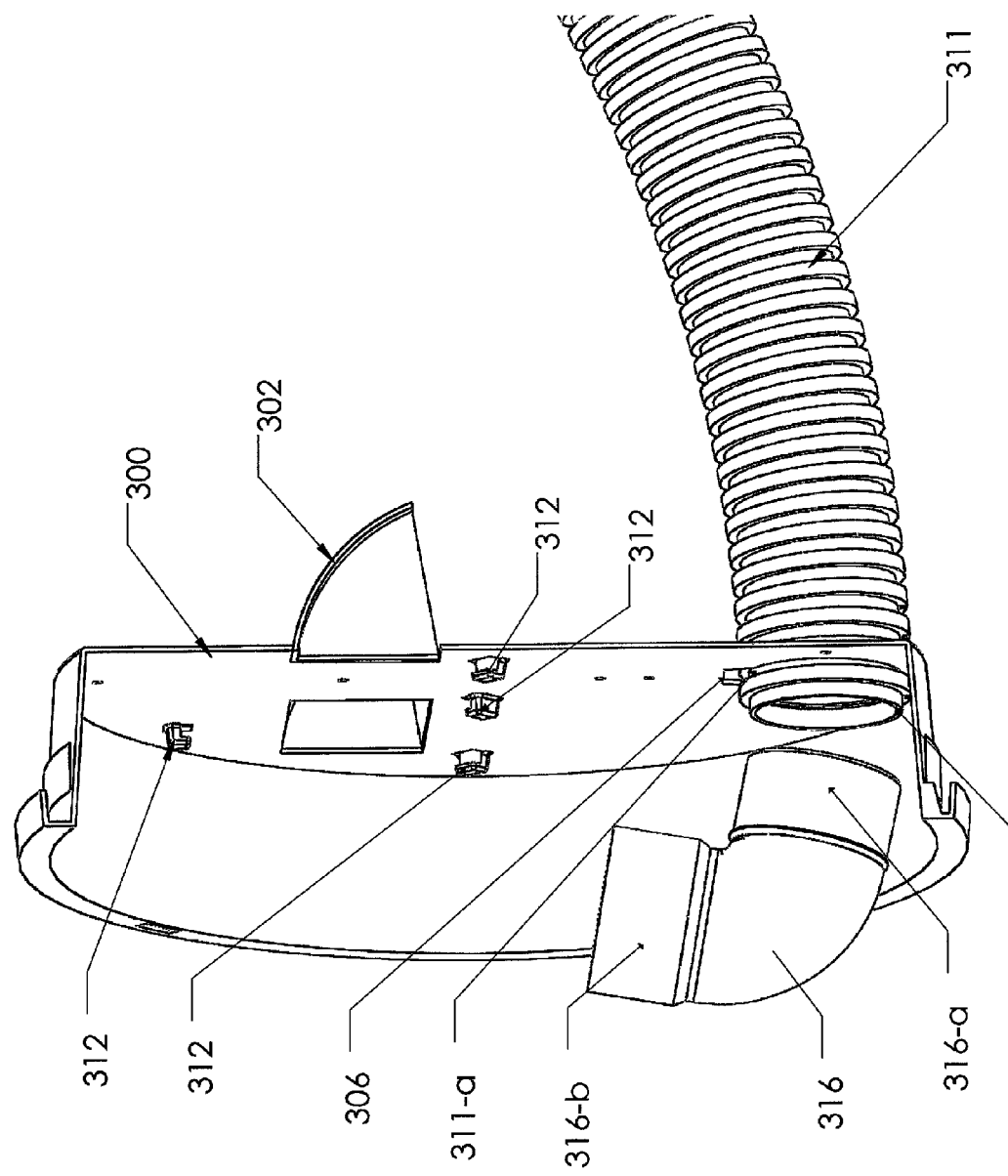
FIG. 5 is a cross section along the axis YY' of the lid with curved edge and domed air outlets showing the insertion of the ribbed connecting pipe into the lid with curved edge and domed air outlets.
Figure 6:
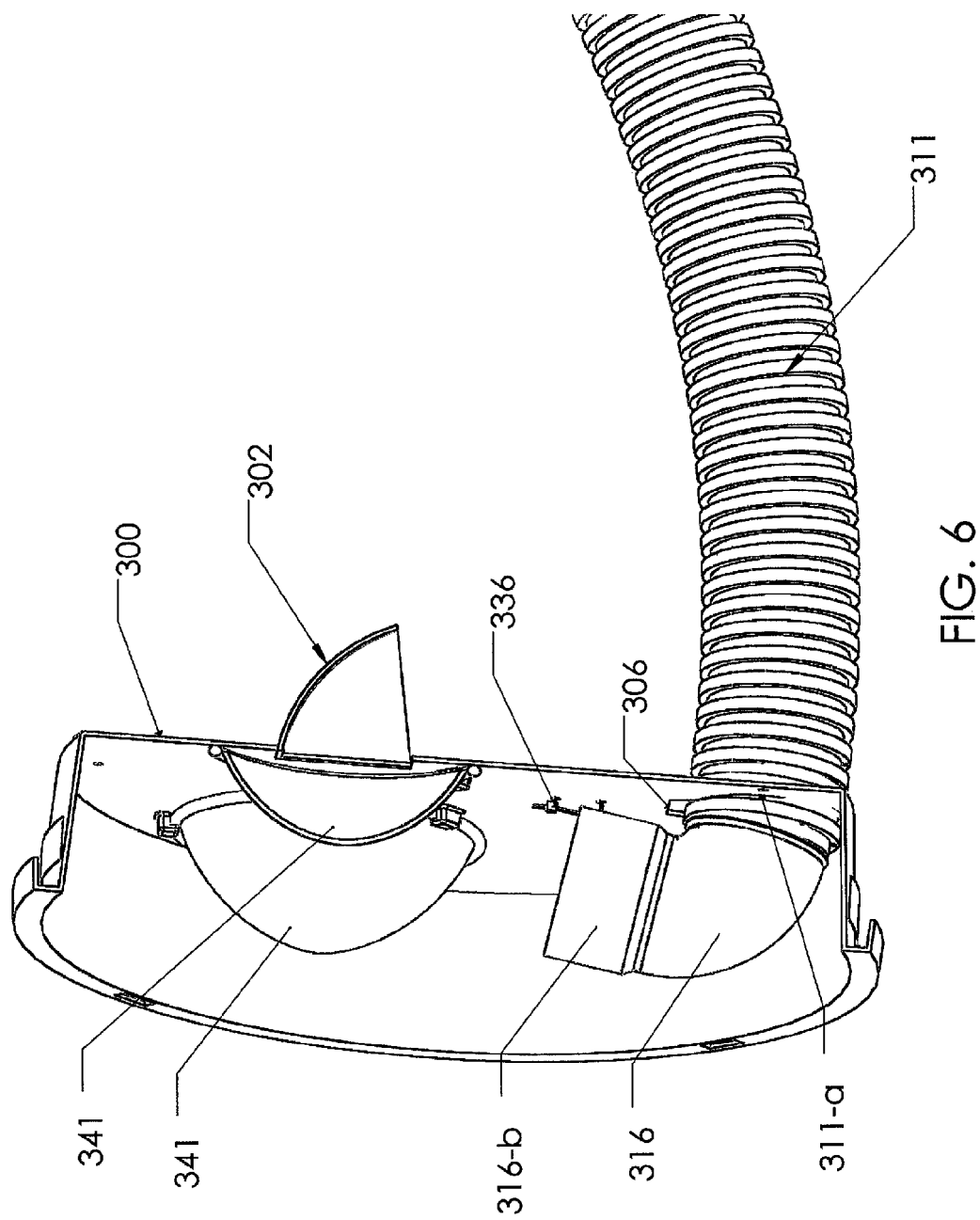
FIG. 6 is a cross section along the axis YY' of the lid with curved edge and domed air outlets showing the insertion of the 90 degree elbow to the entry of debris into the ribbed connecting pipe.
Figure 7:
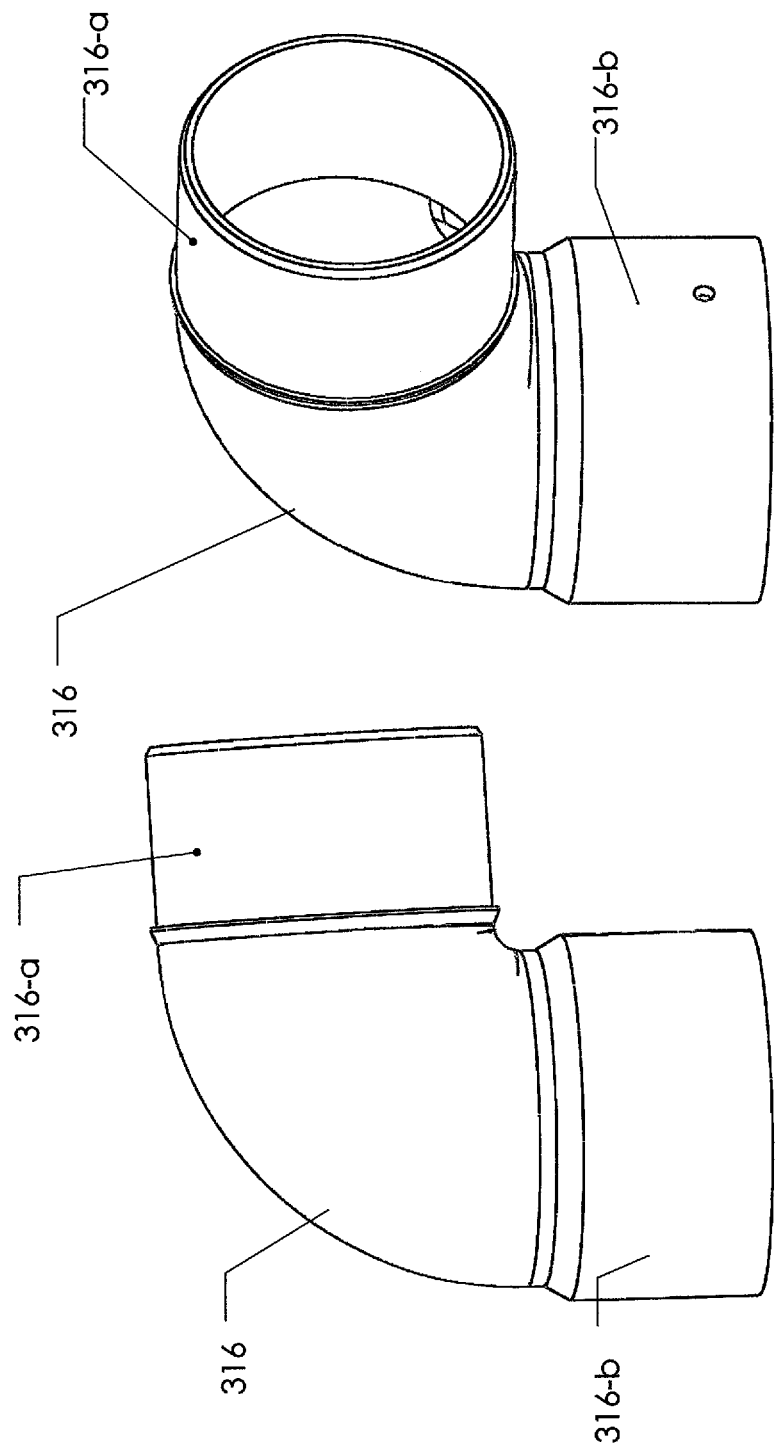
FIG. 7 is side and a perspective view of the 90 degree elbow for the entry of debris.

The shape of the flared U-shaped portion of the third opening 306 creates a space for the easy insertion of the ribbed connecting pipe 311 into the opening 306. The ribbed connecting pipe 311 has a slot 311-b (FIG. 4) on the pipe end that will be inserted into the opening 306. The ribbed connecting pipe 311 is inserted by compressing the pipe walls near the end and releasing the pressure when the groove 311-a (FIGS. 4, 5 and 6) is in the third opening 306. The pipe 311 returns to its shape and is held in place between the two sides of the groove 311-a. The first end 316-a of the 90 degree elbow 316 is then inserted into the ribbed connecting pipe 311 at the slot 311-b (FIGS. 5 and 6). The insertion of the first end (male part) 316-a of the elbow 316 in the opening of the ribbed connecting pipe 311 prevents the walls of the ribbed connecting pipe 311 from falling back on itself. The elbow 316 has a hole in the second end (female part) 316-b (FIG. 7). The elbow 316 is attached onto the inner face of the lid (FIGS. 3 and 6) by passing a plastic cable tie into the hole 336 of the second end (female part) 316-b and the two holes 320 in the lid 300 (FIG. 2). The cable tie 336 is closed on the inside face of the lid 316. When the elbow is attached with the cable tie 336, the female part 316-b of the elbow 316 (FIGS. 3 and 6) is directed between the two strainers 341 and with an angle towards the inside of the lid 300. This angle ensures that the leaves mulched by the blower/vacuum 307 (FIG. 9) strike the rigid wall of the lid before being directed towards the debris collection bag 370 (FIGS. 8 and 9). It is also understood that the length of the ribbed connecting pipe is not always the same and is tailored to the needs of the operator. The length of the ribbed connecting pipe is relatively short when the debris collection bag is moved or a greater length when only the blower/vacuum is moved to vacuum the leaves.

On top of the lid, four small protrusions 309 indicate the position of four raised portions 303 (FIG. 2) on the outer side wall of the lid. The protrusions 309 are only used as reference points. Still on top of the lid, two rectangular marks 315 with the name WilDenLal are printed near the edge of the lid in the central axis XX' (FIG. 2).

The wall 321 of the lid 300 is inclined a few degrees outwards in order to facilitate the movement of debris to the inside of the debris collection bag 370 (FIGS. 8 and 9). The lid 300 has a curved edge 327 bent in a U-shape consisting of the side wall of the lid and the curve of the extension of the latter bent towards the outside of the lid (FIG. 2). Inside the U are lateral reinforcements 331, placed at regular intervals to give more rigidity to the lid 300. The number of reinforcements 331 is twenty, but it may be greater or less according to desired stiffness of the lid 300. Also, at regular intervals, four elevations 303 are placed on the outer wall, preferably rectangular in shape, but can also be square or round. The elevations 303 are molded with the lid so as to leave a minimum space of 1 cm between the elevation and the curved edge 327. The four elevations 303 are placed at an angle of 45 degrees with respect to the YY' central axis. It is understood that this arrangement is not limiting and that the angle may be different relative to the YY' central axis, and the number of elevations can be smaller or larger than four. The elevations 303 are of sufficient height to keep an elastic cord 354 in place (FIGS. 8 and 9) to be placed in the space between the curved edge and the elevations. The elastic cord 354 has a hook 356 (FIG. 8) at each end for holding the ends together when stretched and it surrounds the lid side wall 300. Four sections of anti-skid adhesive tape 310, approximately 2.5 cm wide, are located immediately after the curved edge and are placed on the outside of the side wall of the lid 300. The sections of anti-skid tape 310 are discontinuous and are placed between the elevations 303. Sections of anti-skid tape 310 allow for an increase in the friction between the wall 321 of lid 300 and the debris collection bag 370 (FIGS. 8 and 9) to hold it in place around the lid. Finally, in the curved edge of the lid 300, we can see four holes 326 (FIG. 3). These holes are necessary in order to enable the molding elevations 303.

The ribbed connecting pipe 311 is connected both to the lid 300 and the fan outlet pipe 308 of the blower/vacuum 307 (FIG. 9). The ribbed connecting pipe 311 has on the part which will be connected to the fan outlet pipe 308, a plastic coupling sleeve 360 which covers both a part of the ribbed connecting pipe 311 and the fan outlet pipe 308. The plastic coupling sleeve 360 is tightened strongly against the ribbed connecting pipe 311 and the fan outlet pipe 308 with four plastic cable ties. Two cable ties 358-1a and 358-1b are placed near the end of the plastic coupling sleeve 360 that covers the ribbed connecting pipe 311, and two cable ties 358-2a and 358-2b are placed near the end of the plastic coupling sleeve which covers the fan outlet pipe 308 of the blower/vacuum 307. On the part of the plastic coupling sleeve 360 that covers the ribbed connecting pipe 311, the plastic cable ties 358-1a and 358-1b are placed into two grooves separated by a ridge.

FIG. 9 shows a perspective view of the lid 300 inserted into the debris collection system in its assembled form. The debris collection system includes the suction pipe 304 and the fan outlet pipe 308 of the blower/vacuum 307, the plastic coupling sleeve 360 with the plastic cable ties 358-1a, 358-1b, 358-2a and 358-2b, the ribbed connecting pipe 311, the lid 300 with the two air outlets 302, the handle 323, the elastic cord 354 and the hooks 356 to hold the bag 370 around the lid 300 and the protective membrane 330. The membrane 330 has a hole 329 (FIG. 8) in the center to about 5 cm from the front edge to allow its insertion around the ribbed connecting pipe 311 and two holes 317 to allow the insertion of two cable ties 343. Once the membrane 330 is inserted, it is held in place by the ribbed connecting pipe 311 and the elastic cord 354. In this arrangement, the edge of the debris collection bag 370 is placed around the lid 300 and the elastic cord 354 goes around both the membrane 330 and the debris collection bag 370, this latter is caught between the side wall 321 of the lid 300 and the membrane 330. This arrangement keeps the membrane 330 under the bag 370 when moving. The membrane 330 is formed in its preferred form with a bag in thick plastic or other resistant material. The elastic cord 354 is shown with a hook type of single stem 356 (FIG. 8), but it is also understood that other forms of hooks can be used. It is also noted that the cable ties 358-2a and 358-2b used to hold the plastic coupling sleeve 360 to the fan outlet pipe 308 of the blower/vacuum 307 may be reusable or non-reusable cable tie. Reusable cable ties make it easier to release the blower/vacuum 307 for storage.

On the front of the lid is placed a piece of thick plastic or metal 325 (FIGS. 8 and 9). This part covers the front of the membrane 330 and a portion near the underside of the lid 300. The piece 325 is to protect the underside of the membrane 330 most exposed to wear and to facilitate the sliding of the membrane 330 on the ground. The piece 325 is introduced by the opening 322 on the piece 325 and is attached to the lid with plastic cable ties 343. At first, the thin portion of a first cable tie is inserted into the holes 319, 317 and 318 (FIG. 8). Secondly, by the inside of the lid 300, the thin portion of the first cable tie is inserted into the head of a second cable tie. The second cable tie is then tightened against the lid so that the head of the first cable tie rests on the part 325 and the head of the second on the inside of the lid 300. The excess parts of cable ties are cut in order to not affect the movement of debris. A plastic cable tie 335 (FIGS. 8 and 9) is then placed to surround the ribbed connecting pipe 311 at the point where the part 316-a of the 90 degree elbow 316 is inserted. The cable tie 335 is placed in a groove of the ribbed connecting pipe 311 and is there to prevent removal of the elbow when it is inserted into the ribbed connecting pipe 311.

Figure 11:
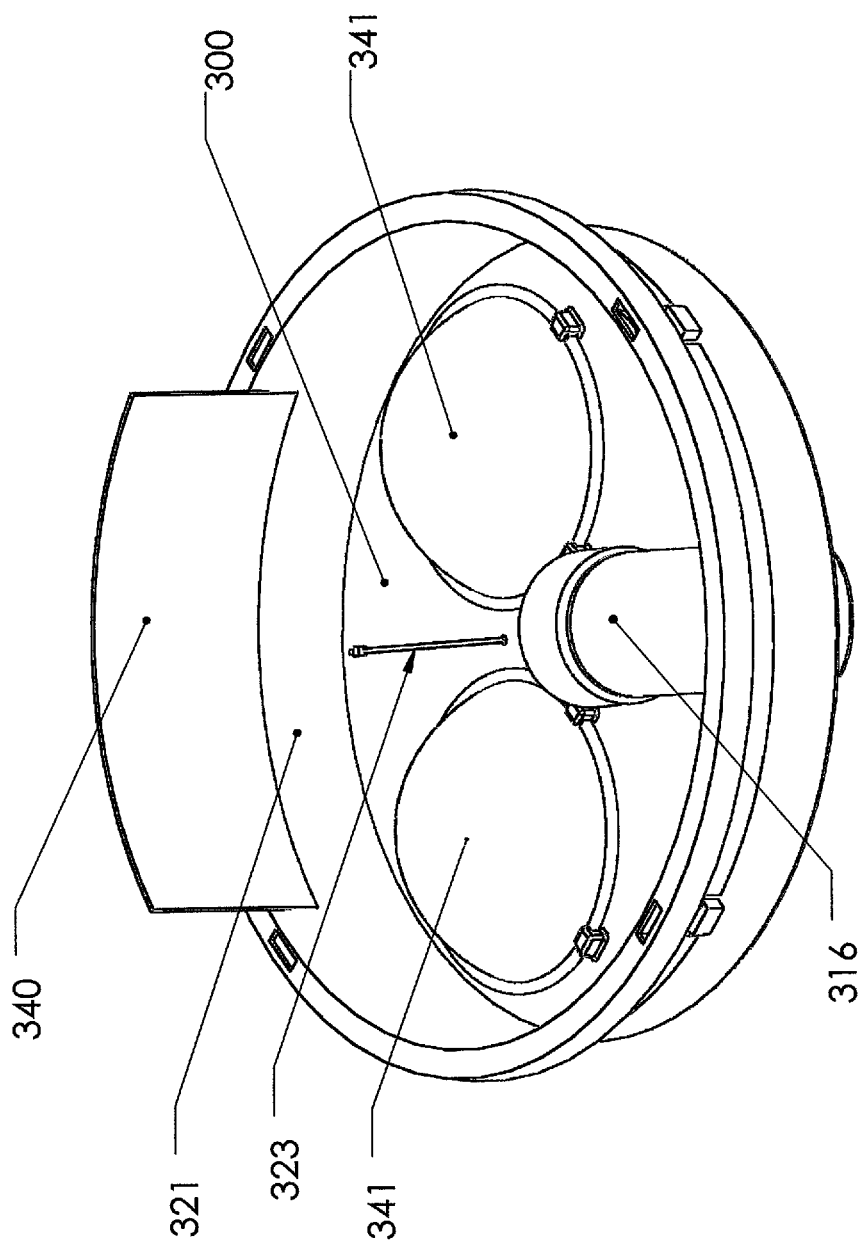
FIG. 11 is a perspective view of the lid with curved edge and domed air outlets with the plastic membrane bonded to the side wall of the lid.

A thick plastic membrane 340 (FIG. 11) may be bonded to the inner side wall of the lid 300, opposite to the elbow 316. A part of the membrane extends to the inside of the debris collection bag 370. This membrane provides an extension to the lid wall 300 to further protect the wall of the bag 370 when the debris enters. This membrane is only useful when using bag 370 whose wall is very thin.

Operation of the Debris Collection System

To use the debris collection system of the present invention (FIG. 9), the operator must first install the various components on the lid. The operator must first place the sections of the self-adhesive anti-skid tape 310 on the wall 321 of the lid, at the bottom of the curved edge 327. Thereafter, on the underside of the lid, the operator inserts the two strainers 341 between the hooks 312.

Then the operator makes the handle 323 by introducing a plastic cable tie in both holes 313 and closes it onto the inside of the lid 300.

In the next step, the operator inserts the ribbed connecting pipe into the front opening 329 of the membrane 330 and then into the opening of the piece of thick plastic or metal 322.

Then the operator inserts into the opening 306, by the outer face of the lid, a groove of the ribbed connecting pipe 311, which is in the part with the slot, and then the male part 316-a of the elbow 316 into the opening of the ribbed connecting pipe 311, then the operator attaches the female part 316-b of the elbow 316 with the cable tie 336. The female section of the elbow 316 is then directed between the two strainers 341. This ensures directional stability of the elbow to the entry of debris and air.

The piece of thick plastic or metal 325 and the membrane 330 are then attached to the lid 300 with the cable ties 343. Then the operator places the cable tie 335 around the ribbed connecting pipe 311 where the elbow 316 is inserted into the ribbed connecting pipe. The cable tie 335 is placed in a groove of the ribbed connecting pipe 311. The operator then glues the plastic membrane 340 onto the inner side wall of the lid 300 to protect the wall of the debris collection bag 370.

The next step consists in the insertion of the ribbed connecting pipe 311 and the fan outlet pipe 308 in the flexible plastic coupling sleeve 360. The fan outlet pipe 308 also enters into the ribbed connecting pipe 311 for a better hold. The cable ties 358-1a, 358-1b, 358-2a and 358-2b are then placed around the plastic coupling sleeve 360 near the ends. The cable ties are then tightened around the plastic coupling sleeve 360 to seal the joint and to hold the ribbed connecting pipe 311 to the fan outlet pipe 308 of the blower/vacuum 307. The cable ties 358-2a and 358-2b are placed behind the bulge of the fan outlet pipe 308. The final steps are to insert the part of the lid into the opening of the bag 370 to collect the debris and then to put the elastic cord 354 over the membrane 330 and the bag 370 between curved edge 327 and the elevations 303 of the lid. The two hooks 356 of the elastic cord 354 are used to connect the two ends and to keep tension on the walls of the membrane 330 and the bag 370. In this position, the top of the lid 300 is perpendicular to the walls of the membrane 330 and the bag 370.

Next, the operator activates the blower/vacuum 307 and proceeds with the vacuuming up of leaves or twigs. The leaves and the air sucked up are thrown out by the fan outlet pipe 308 of the blower/vacuum 307 into the ribbed connecting pipe 311 and then into the lid 300 between the two strainers 341, up to the wall of the lid. From there, the debris is deflected laterally towards the bottom of the bag 370 for collection of the debris while the air flow brought in passes through the strainers 341 and goes out of the bag 370. The fast air flow between the two strainers 341 has the effect of preventing debris from adhering sufficiently to the domed surface of the strainers to negatively affect the air outlet. When the bag 370 begins to fill up, the operator stops the blower/vacuum 307, lifts the lid by using the handle 323 and compresses the debris by pressing the side of the bag 370 in order to put in more debris. The operator restarts the blower/vacuum 307 and continues to collect leaves.

The operator can move around the field by sliding the bag on the ground without having to carry the weight of the debris. The membrane 330 and the part of thick plastic or metal 325 under the bag protect and facilitate the sliding of the bag 370 on the ground. When the bag 370 is full, the operator stops the blower/vacuum 307, loosens the elastic cord 354 around the lid to remove the tension on the bag 370, frees the bag 370 from the lid and slightly compresses the top of the bag 370 in order to have enough space to close the opening of the bag 370 with a tie or a knot. The debris remains in the collection bag 370 without having to pour it into another bag. The operator places a new bag 370 on the side wall of the lid, installs the elastic cord 354, restarts the blower/vacuum 307 and can proceed rapidly to the work of collecting leaves and other lawn debris.

All kinds of bags can be used, provided they are large enough to insert the lid in the opening of the bag 370. The type of bag can be sealed or not, plastic, paper or other material.

To store the blower/vacuum, the cable ties 358-2a and 358-2b which go around the fan outlet pipe 308 are removed, which allow the operator to disconnect the ribbed connecting pipe 311 of the blower/vacuum 307. The debris collection system can then be stored in two parts, namely blower/vacuum 307 and the ribbed connecting pipe 311 with the lid and its various components.

Cable ties 358-2a and 358-2b can be provided with a release mechanism and are reusable or disposable; they must then be cut to be removed. These inexpensive cable ties are sold commercially and can be easily replaced by the operator.

We claim:

1. A lid for leaves collection with a blower/vacuum and the rejection of debris into a bag, the lid is round shape with a flat or domed top with a lateral side with a curved 360-degree U-shaped edge which comprises: a) a first and a second rectangular openings with domed top and back for air outlet; b) a third partially round opening with a flared U-shape for entry of debris; c) a first and a second strainers for retention of debris and air filtration; d) molded hooks at the same time as the lid to hold the first and the second strainers for retention of debris and air filtration; e) two holes in the lid to make a handle with a plastic cable tie; f) a 90 degree elbow for the entry of debris with a first end and a second end with a hole in a wall; g) two holes in the lid for inserting a plastic cable tie used for attaching the second end of the 90 degree elbow; h) a ribbed connecting pipe in plastic; i) elevations placed at equal distances on the lateral side of the lid; j) sections of rough anti-skid tape; k) the side wall of the lid inserted into the opening of a debris collection bag; l) a plastic membrane for supporting the debris collection bag; m) an elastic cord surrounding the membrane and the debris collection bag; n) a piece of thick plastic or metal to protect and facilitate the sliding on the floor of the plastic membrane; o) two holes on the top of the lid to attach the piece of thick plastic; p) a plastic coupling sleeve to hold the ribbed connecting pipe to the blower/vacuum; q) four plastic cable ties to hold the plastic coupling sleeve on the ribbed connecting pipe and on a fan outlet pipe of the blower/vacuum.

2. The lid of claim 1 wherein the curved 360 degree U-shaped edge is made by the lateral side of the lid and the curve of the extension of the wall folded towards the outside of the lid.

3. The lid of claim 2 wherein the first and the second openings for air outlet form an integral part of the lid which has been molded at the same time as the lid.

4. The lid of claim 1 wherein the third opening for entrance of debris is in part round with a flared U-shaped extension whose base is directed towards the center of the lid.

5. The lid of claim 1 wherein the first and the second strainers are used for retention of debris and filtering the air that exits through the first and the second openings.

6. The lid of claim 1 wherein six hooks are molded at the same time as the lid to hold the first and the second strainers for retention of debris and air filtration.

7. The lid of claim 1 wherein the air and the debris that enters into the lid are directed between the first and the second strainers and towards the inside of the lid.

8. The lid of claim 1 wherein the two holes in the lid to make the handle with the plastic cable tie are located between the first and the second openings for air outlet on a central axis YY' passing through the center of the lid and the center of the round portion of the third opening to allow debris in, the central axis YY' being perpendicular to a central axis XX' also passing through the center of the lid.

9. The lid of claim 1 wherein the two holes in the lid for inserting the plastic cable tie used for attaching the second end of the 90 degree elbow are located near the flared U of the third opening on a central axis YY' passing through the center of the lid and the center of the round portion of the third opening to allow debris in, the central axis YY' being perpendicular to a central axis XX' also passing through the center of the lid.

10. The lid of claim 1 wherein the 90 degree elbow for the entry of debris with the hole in the wall of the second end can be attached through the hole with a cable tie to the inner face of the lid and that the first end can be inserted into an opening of the ribbed connecting pipe.

11. The lid of claim 1 wherein the ribbed connecting pipe is formed by a section of drain pipe made of ribbed and grooved plastic.

12. The lid of claim 1 wherein the ribbed connecting pipe has a slot near one of the two ends.

13. The lid of claim 12 wherein a groove at the slot of the ribbed connecting pipe is inserted into the third opening of the lid.

14. The lid of claim 13 wherein the ribbed connecting pipe is held inside the third opening of the lid by the sides of the groove on the ribbed connecting pipe.

15. The lid of claim 1 wherein four plastic elevations are molded at the same time as the lid on the side wall of the lid.

16. The lid of claim 1 wherein the sections of rough anti-skid tape are glued on the lateral side of the lid at the lower end of the 360 degree curved edge.

17. The lid of claim 1 wherein the two holes used to attach the piece of thick plastic or metal are placed on each side of the third opening for entrance of debris on an axis which passes through the center of the round portion of the third opening and which is parallel to a central axis XX ' passing through the center of the lid, the central axis XX' being perpendicular to a central axis YY' passing through the center of the lid and the center of the round portion of the third opening.

18. The lid of claim 1 wherein cable ties are inserted into the two holes on each side of the third opening of the lid, the two holes on the part of thick plastic or metal and the two holes in the front portion of the plastic membrane in order to maintain all three together.

19. The lid of claim 1 wherein the piece of thick plastic or metal is attached to the front portion of the membrane and the lid and of which a portion is under the membrane to protect it from the roughness of the ground and facilitate the sliding on the ground.

20. The lid of claim 1, wherein the side wall of the lid is inserted into the opening of the debris collection bag and the bag is held around the lid with the elastic cord placed over the membrane and the plastic wall of the debris collection bag.

21. The lid of claim 1 wherein the ribbed connecting pipe is held to the fan outlet pipe of the blower/vacuum with the plastic coupling sleeve and the four plastic cable ties.

22. The lid of claim 1 wherein a cable tie is placed around the ribbed connecting pipe at the point where the first end of the 90 degree elbow is inserted into the ribbed connecting pipe.

23. The lid of claim 1 wherein a plastic membrane is glued to the inner side wall of the lid which is situated opposite the third opening for entry of debris, and in which a part of the membrane extends into the interior of the debris collection bag.

* * * * *